(No Model.)

M. W. JORDAN.
COMBINED TABLE AND CARRIAGE FOR POTTERS.

No. 274,001. Patented Mar. 13, 1883.

WITNESSES:
W. W. Hollingsworth
A. G. Lepre

INVENTOR:
M. W. Jordan
BY
ATTORNEYS.

UNITED STATES PATENT OFFICE.

MICHAEL W. JORDAN, OF BELLAIRE, OHIO.

COMBINED TABLE AND CARRIAGE FOR POTTERS.

SPECIFICATION forming part of Letters Patent No. 274,001, dated March 13, 1883.

Application filed November 28, 1882. (No model.)

*To all whom it may concern:*

Be it known that I, MICHAEL W. JORDAN, of Bellaire, in the county of Belmont and State of Ohio, have invented a new and useful Improvement in Combined Working-Tables and Carriages for Potters and Stone-Workers, of which the following is a full, clear, and exact description, reference being had to the annexed drawings, forming part of this specification.

This invention consists of the novel construction hereinafter described and claimed.

Figure 1:
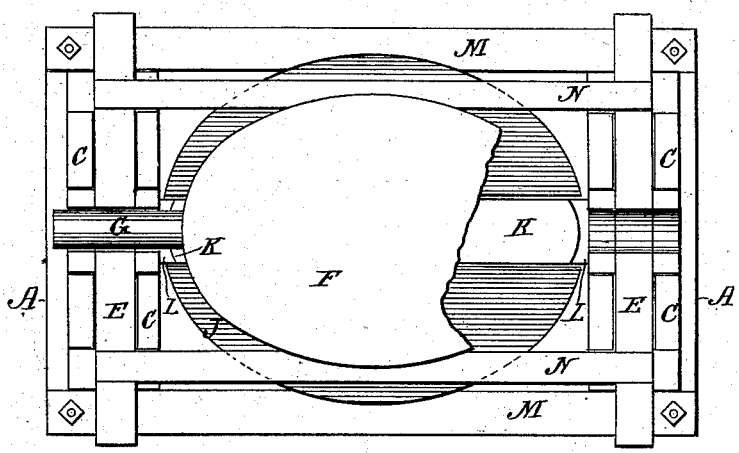
Figure 2:
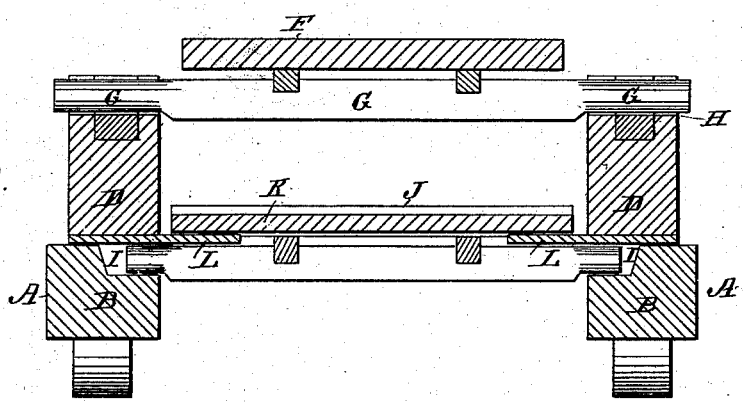
Figure 3:
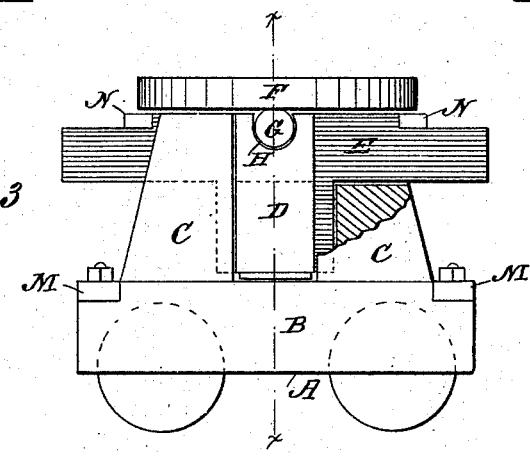

In the drawings, Figure 1 is a plan view of my invention, partly broken away. Fig. 2 is a longitudinal vertical section. Fig. 3 is a side elevation, partly broken away; and Fig. 4 is a stone adapted for being supported on the trucks A when the table is removed.

A A indicate two trucks of similar construction, consisting of the base B and the two slotted uprights C C. A bearing-block, D, is supported in the uprights by means of the cross-bar E, which rests in the bottoms of the slots in the uprights. The blocks D are to be provided with means for adjusting them higher or lower in the standards or uprights C in order that a table, F, supported upon a rod, G, which rests in the bearings H in the blocks D, may be raised or lowered. In the bases B of the trucks are formed bearings I for another table, J, having a movable central leaf, K, which is supported upon flanges L, projecting inward from the bottoms of the bearing-blocks D. The two trucks are to be detachably connected together by means of cross-bars M M, resting upon the bases B, on opposite sides of the carriage thus formed, and the sides of the table J are to be supported upon these cross-bars to keep the table from turning upon its rod. Likewise cross-bars N N are to be put upon the ends of the cross-bars E of the bearing-blocks to support the sides of the table F. The table F is adapted to be turned down at either side to transfer an object to the lower table, J, as in the manufacture of pottery.

Figure 4:
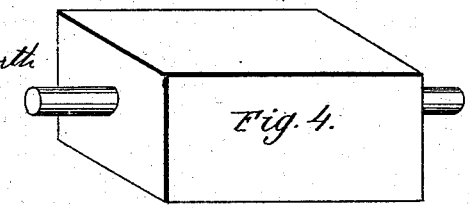

The trucks A may be used for transporting a stone from one place to another when the stone is provided with gudgeons, as shown in Fig. 4.

What I claim is—

1. A combined table and carriage consisting of two trucks detachably connected together by cross-bars, and combined with one or more oscillatory tables supported in suitable bearings, substantially as shown and described.

2. A combined table and carriage consisting of two trucks having adjustable bearing-blocks and connecting-bars, combined with an oscillatory table supported in fixed bearings and having a removable central leaf, and an oscillatory table supported in the adjustable bearing-blocks, and bars for supporting the sides of said table, substantially as shown and described.

MICHAEL W. JORDAN.

Witnesses:
WILLIAM ZIMMER,
JOHN KELLY.